(12) United States Patent
Gretton

(10) Patent No.: US 7,835,857 B2
(45) Date of Patent: Nov. 16, 2010

(54) NAVIGATION DEVICE DISPLAYING TRAVEL INFORMATION

(75) Inventor: Mark Gretton, London (GB)

(73) Assignee: TomTom International B.V., Amsterdam (NL)

( * ) Notice: Subject to any disclaimer, the term of this patent is extended or adjusted under 35 U.S.C. 154(b) by 1014 days.

(21) Appl. No.: 10/598,889

(22) PCT Filed: Mar. 15, 2005

(86) PCT No.: PCT/GB2005/000984

§ 371 (c)(1),
(2), (4) Date: Sep. 14, 2006

(87) PCT Pub. No.: WO2005/088254

PCT Pub. Date: Sep. 22, 2005

(65) Prior Publication Data

US 2007/0185648 A1    Aug. 9, 2007

(30) Foreign Application Priority Data

Mar. 15, 2004   (GB)   .................... 0405795.6

(51) Int. Cl.
G01C 21/00 (2006.01)

(52) U.S. Cl. .................. 701/208; 713/1; 713/2; 713/100

(58) Field of Classification Search ........... 701/208; 713/1, 2, 100
See application file for complete search history.

(56) References Cited

U.S. PATENT DOCUMENTS

| 6,021,372 | A | | 2/2000 | Harrington et al. | |
|---|---|---|---|---|---|
| 6,144,318 | A | * | 11/2000 | Hayashi et al. | 340/995.19 |
| 6,594,723 | B1 | * | 7/2003 | Chapman et al. | 711/103 |
| 6,768,942 | B1 | * | 7/2004 | Chojnacki | 701/200 |
| 6,775,768 | B1 | * | 8/2004 | Raspe | 713/2 |
| 2003/0114206 | A1 | | 6/2003 | Timothy et al. | |
| 2003/0163254 | A1 | | 8/2003 | Chen et al. | |
| 2004/0030715 | A1 | * | 2/2004 | White et al. | 707/102 |
| 2004/0039661 | A1 | | 2/2004 | Fuzell-Casey et al. | |
| 2004/0143388 | A1 | * | 7/2004 | Yano et al. | 701/209 |

(Continued)

FOREIGN PATENT DOCUMENTS

DE    19947481    4/2001

(Continued)

OTHER PUBLICATIONS

Load OS into RAM, Jul. 8, 2003, http://www.techimo.com/forum/general-tech-discussion/71360-load-os-into-ram.html.*

(Continued)

*Primary Examiner*—Khoi Tran
*Assistant Examiner*—Nikhil Sriraman
(74) *Attorney, Agent, or Firm*—Harness, Dickey & Pierce, P.L.C.

(57) ABSTRACT

A navigation device, programmable with map data and a navigation application that enables a route to be planned between two user-defined places; the device is operable to read a removable memory card storing the device operating system, the navigation application, and the map data. It does not need to store the operating system in mask ROM; hence, customization for a specific country requires only that the appropriate memory card be inserted at the time of use.

12 Claims, 8 Drawing Sheets

U.S. PATENT DOCUMENTS

| | | | |
|---|---|---|---|
| 2005/0021190 A1* | 1/2005 | Worrell et al. | 701/1 |
| 2007/0226481 A1* | 9/2007 | Duncan | 713/2 |
| 2008/0086631 A1* | 4/2008 | Chow et al. | 713/2 |
| 2009/0013165 A1* | 1/2009 | Chow et al. | 713/2 |

FOREIGN PATENT DOCUMENTS

| | | |
|---|---|---|
| DE | 10319778 | 7/2004 |
| EP | 1343 082 | 9/2003 |
| GB | 240748 | 2/2005 |
| JP | 11325948 | 11/1999 |
| WO | WO 00/74019 | 12/2000 |
| WO | WO 01/80000 | 10/2001 |

OTHER PUBLICATIONS

Lennart Benscop, "RAM Disks", May 29, 2003, http://www.xs4all.nl/~lennartb/bootloaders/node5.html.*

BIOS Error Beeps, Messages, and Codes, Sep. 29, 2000, http://www.sysopt.com/tutorials/article.php/3552501.*

Advanced Configuration and Power Interface Specification, Revision 2.0b, Oct. 11, 2002, http://www.acpi.info/DOWNLOADS/ACPIspec-2-0b.pdf, see p. 217.*

Klaus Knopper, "Building a self-contained auto-configuring Linux System on an iso 9660 filesystem", 2000.*

* cited by examiner

NAVIGATION DEVICE DISPLAYING TRAVEL INFORMATION

CROSS REFERENCE TO RELATED APPLICATIONS

This application claims the priority of PCT/GB2005/000984 filed on Mar. 15, 2005 and GB 0405795.6 filed on Mar. 15, 2004, the entire contents of which are hereby incorporated in total by reference.

BACKGROUND OF THE INVENTION

1. Field of the Invention

This invention relates to a navigation device that can display travel information. The device finds particular application as an in-car navigation system.

2. Description of the Prior Art

GPS based navigation devices are well known and are widely employed as in-car navigation devices. Reference may be made to the Navigator series software from the present assignee, TomTom B.V. (now TomTom International B.V.). This is software that, when running on a PDA (such as a Compaq iPaq) connected to an external GPS receiver, enables a user to input to the PDA a start and destination address. The software then calculates the best route between the two end-points and displays instructions on how to navigate that route. By using the positional information derived from the GPS receiver, the software can determine at regular intervals the position of the PDA (typically mounted on the dashboard of a vehicle) and can display the current position of the vehicle on a map and display (and speak) appropriate navigation instructions (e.g. 'turn left in 100 m'). Graphics depicting the actions to be accomplished (e.g. a left arrow indicating a left turn ahead) can be displayed in a status bar and also be superimposed over the applicable junctions/turnings etc in the roads shown in the map itself.

Reference may also be made to devices that integrate a GPS receiver into a computing device programmed with a map database and that can generate navigation instructions on a display. These integrated devices are often mounted on or in the dashboard of a vehicle. The term 'navigation device' refers to a device that enables a user to navigate to a pre-defined destination. The device may have an internal system for receiving location data, such as a GPS receiver, or may merely be connectable to a receiver that can receive location data. The device may be a portable device or may be built-into a vehicle.

Conventional GPS based navigation devices (in common with other forms of embedded devices or systems) execute all the OS and applications code in place from a large mask ROM or XIP (execute in Place) Flash memory device. There are several disadvantages to this: ROM based designs generally require the ROM to be burnt at an early stage in the manufacture of a product; once the ROM mask is fixed, altering it is costly and can be complex. Hence, ROM based design are inherently inflexible. Secondly, mask ROM and XIP Flash are costly.

SUMMARY OF THE INVENTION

In a first aspect, there is a navigation device, programmable with map data and a navigation application that enables a route to be planned between two user-defined places, wherein the device is operable to read a memory card that can be inserted into and removed from the device, the card storing the device operating system, the navigation application, and the map data.

The device does not store its operating system in internal ROM but instead reads if off from the memory card, which may be a SD card.

The device may further comprise XIP (eXecute In Place) Flash ROM programmed with a boot loader. On boot up, the boot loader prompts for the user to insert the supplied SD card. Once the user inserts the SD card, a card reader in the device reads the card; the device then copies a special system file from the SD card into device DRAM, the system file including the operating system and the navigation application. Once copying of the system file is complete, control will be passed to the navigation application, which starts and accesses non-volatile data from the SD card. When the device is subsequently switched off, the DRAM contents is preserved so that the boot up procedure only has to occur the first time the device is used.

This approach has a number of advantages over conventional ROM based systems:

1. Late configurability. By only 'hard coding' onto the device a boot loader in XIP Flash, the device can be configured in terms of locale and variant at a late stage in the manufacture by simply including the appropriate SD card with the finished device.

2. Cost. SD Flash memory and DRAM are the cheapest forms of memory and are cheaper than XIP Flash memory.

3. Speed. Memory access times for DRAM are much lower than those for flash memory.

BRIEF DESCRIPTION OF THE DRAWINGS

The present invention will be described with reference to the accompanying drawings, in which.

DETAILED DESCRIPTION

System Overview

The present invention is implemented in an integrated navigation device from TomTom B.V. (now TomTom International B.V.) called Go. Go deploys navigation software called Navigator and has an internal GPS recevier; Navigator software can also run on a touch screen (i.e. stylus controlled) Pocket PC powered PDA device, such as the Compaq iPaq. It then provides a GPS based navigation system when the PDA is coupled with a GPS receiver. The combined PDA and GPS receiver system is designed to be used as an in-vehicle navigation system.

The invention may also be implemented in any other arrangement of navigation device, such as one with an integral GPS receiver/computer/display, or a device designed for non-vehicle use (e.g. for walkers) or vehicles other than cars (e.g. aircraft). The navigation device may implement any kind of position sensing technology and is not limited to GPS; it can hence be implemented using other kinds of GNSS (global navigation satellite system) such as the European Galileo system. Equally, it is not limited to satellite based location/velocity systems but can be deployed using ground-based beacons or any other kind of system that enables the device to determine its geographic location.

Figure 1:
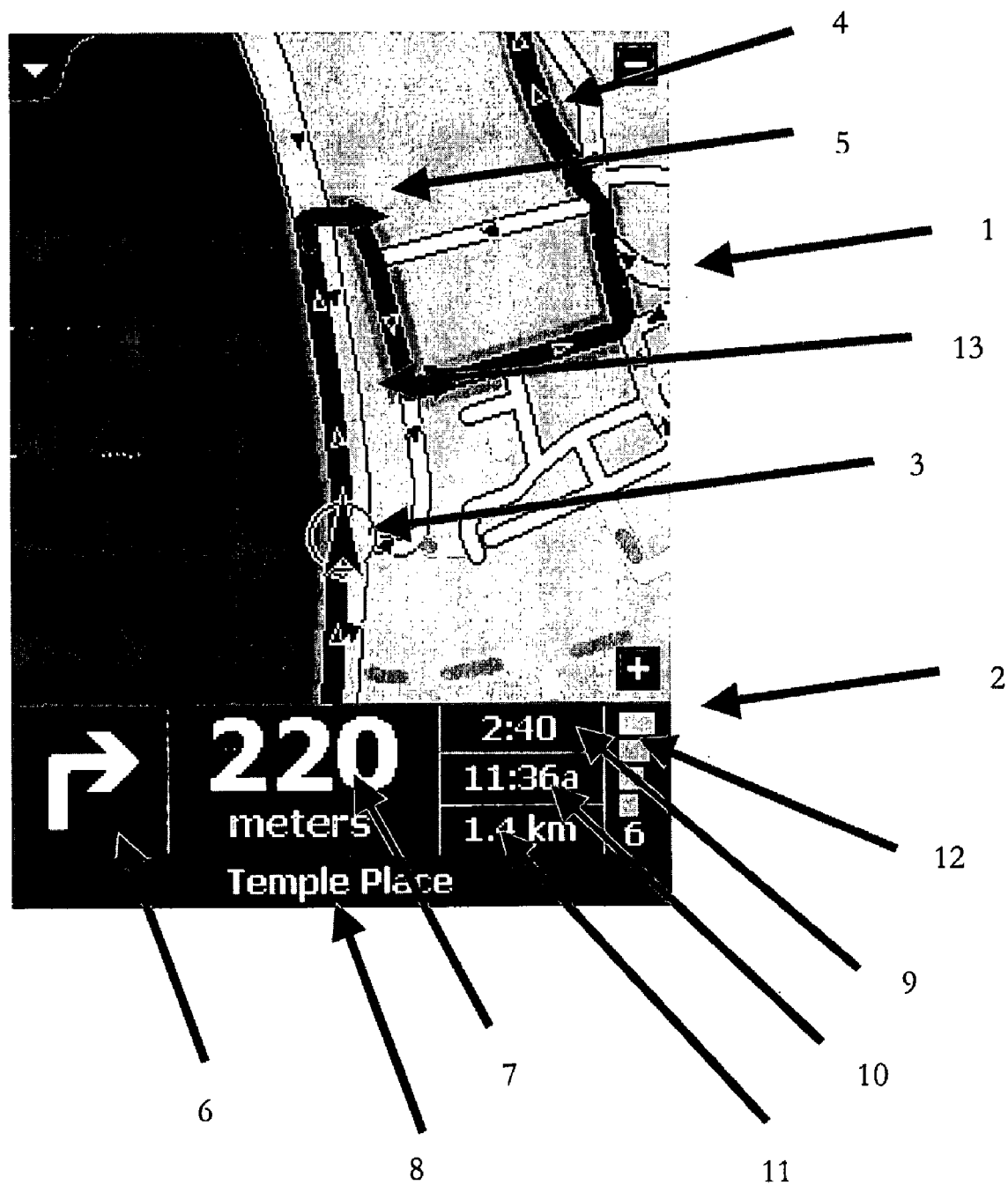
FIG. 1 is a screen shot from a navigation device implementing the present invention; the screen shot shows a plan map view and a status bar running along the bottom of the display.
Figure 2:
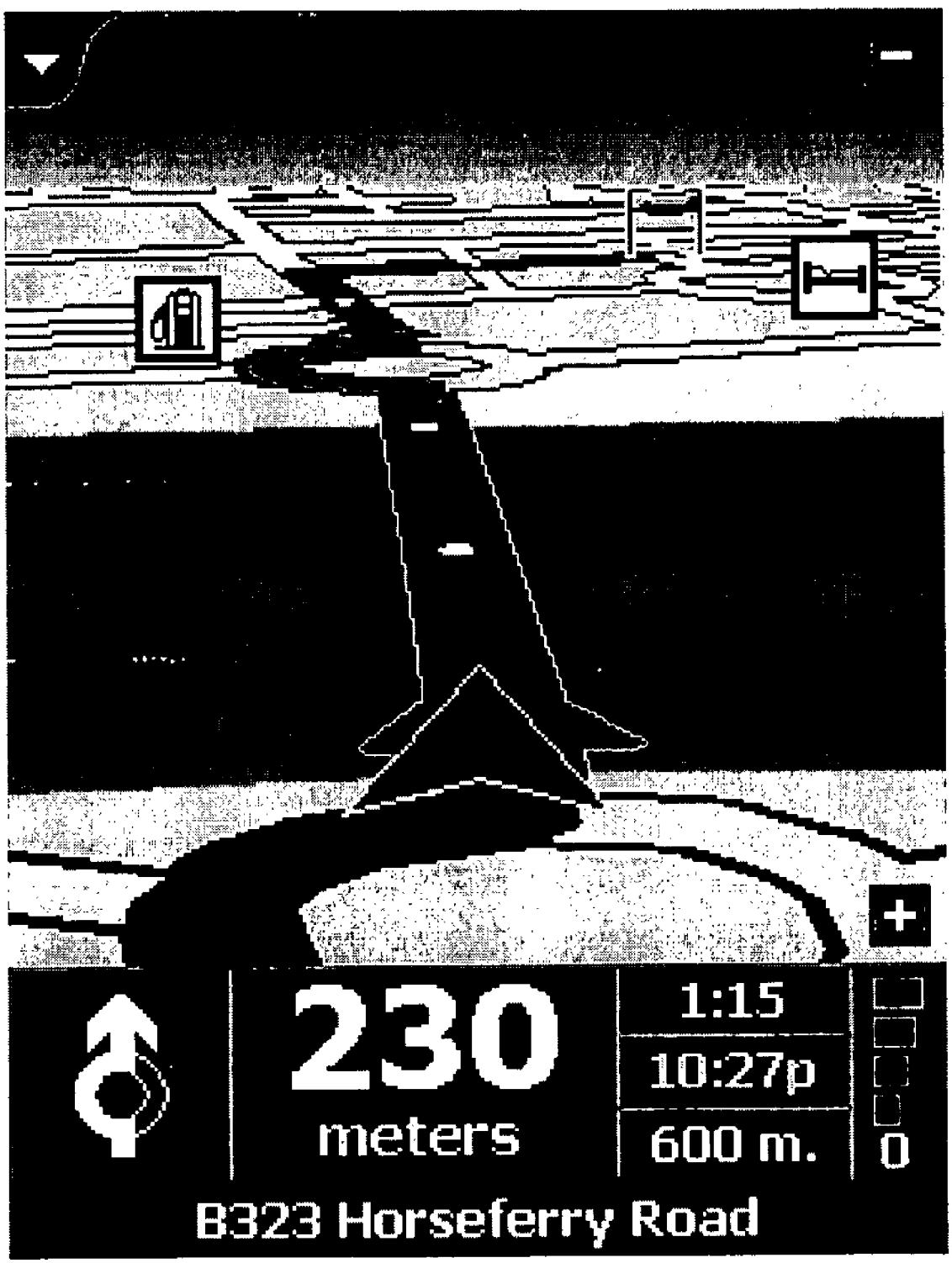
FIG. 2 is a screen shot from the navigation device implementing a 3-D view.

Navigator software, when running on a PDA, results in a navigation device that causes the normal navigation mode screen shown in FIG. 1 to be displayed. This view provides driving instructions using a combination of text, symbols, voice guidance and a moving map. Key user interface elements are the following: a 2-D map 1 occupies most of the screen. The map shows the user's car and its immediate surroundings, rotated in such a way that the direction in which the car is moving is always "up". Running across the bottom quarter of the screen is the status bar 2. The current location of the device, as the device itself determines using conventional GPS location finding and its orientation (as inferred from its direction of travel) is depicted by an arrow 3. The route calculated by the device (using route calculation algorithms stored in device memory as applied to map data stored in a map database in device memory) is shown as darkened path 4 superimposed with arrows giving the travel direction. On the darkened path 4, all major actions (e.g. turning corners, crossroads, roundabouts etc.) are schematically depicted by arrows 5 overlaying the path 4. The status bar 2 also includes at its left hand side a schematic 6 depicting the next action (here, a right turn). The status bar 2 also shows the distance to the next action 7 (i.e. the right turn—here the distance is 220 meters) as extracted from a database of the entire route calculated by the device (i.e. a list of all roads and related actions defining the route to be taken). Status bar 2 also shows the name of the current road 8, the estimated time before arrival 9 (here 2 minutes and 40 seconds), the actual estimated arrival time 10 (11.36 am) and the distance to the destination 11 (1.4 Km). The GPS signal strength is shown in a mobile-phone style signal strength indicator 12. A 3-D map view is also possible, as shown in FIG. 2.

Figure 3:
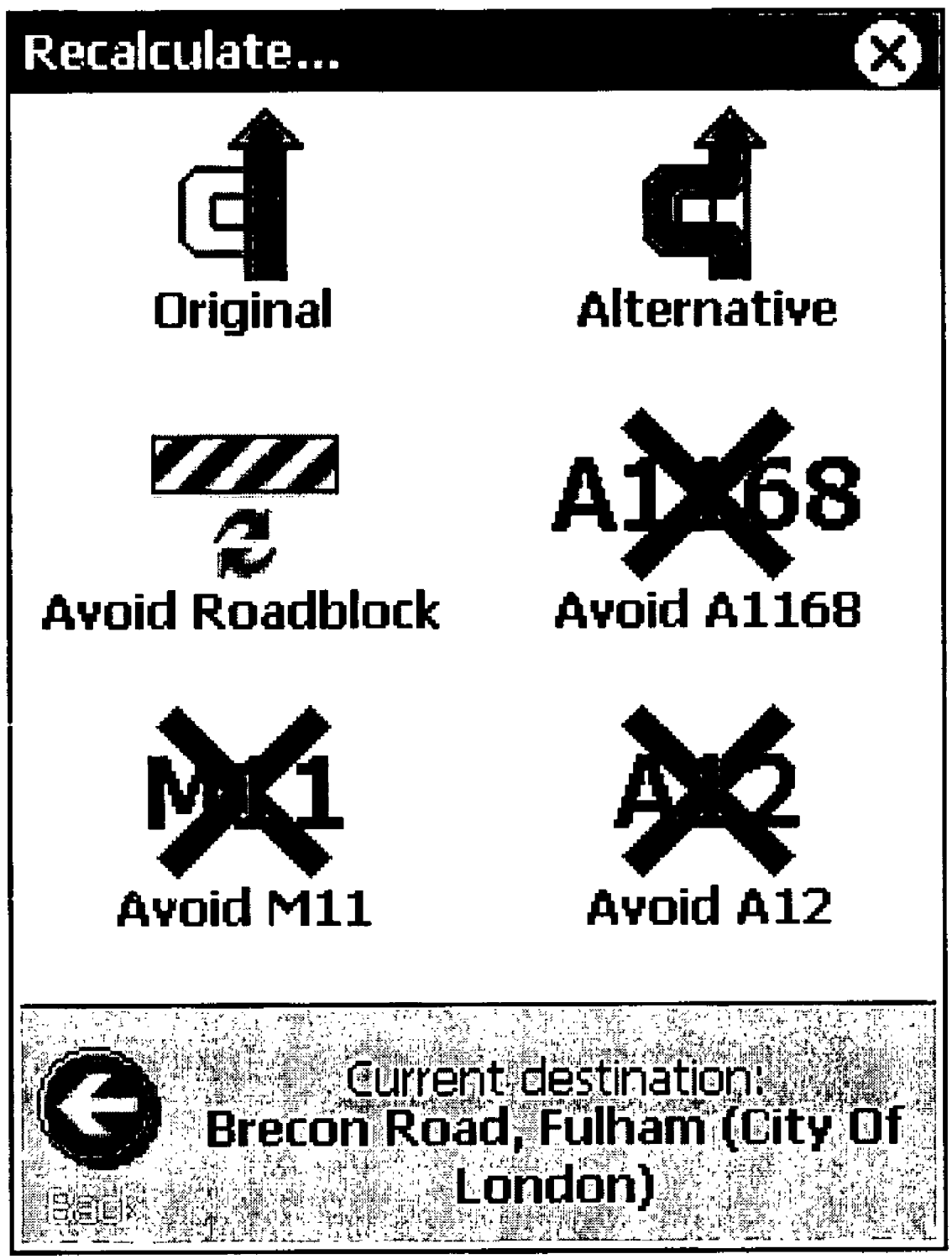
FIG. 3 is a screen shot from the navigation device showing a navigation menu.

If the user touches the centre of the screen 13, then a navigation screen menu is displayed (FIG. 3); from this menu, other core navigation functions within the Navigator application can be initiated or controlled. Allowing core navigation functions to be selected from a menu screen that is itself very readily called up (e.g. one step away from the map display to the menu screen) greatly simplifies the user interaction and makes it faster and easier.

The area of the touch zone which needs to be touched by a user is far larger than in most stylus based touch screen systems. It is designed to be large enough to be reliably selected by a single finger without special accuracy; i.e. to mimic the real-life conditions for a driver when controlling a vehicle; he or she will have little time to look at a highly detailed screen with small control icons, and still less time to accurately press one of those small control icons. Hence, using a very large touch screen area associated with a given soft key (or hidden soft key, as in the centre of the screen 13) is a deliberate design feature of this implementation. Unlike other stylus based applications, this design feature is consistently deployed throughout Navigator to select core functions that are likely to be needed by a driver whilst actually driving. Hence, whenever the user is given the choice of selecting on-screen icons (e.g. control icons, or keys of a virtual keyboard to enter a destination address, for example), then the design of those icons/keys is kept simple and the associated touch screen zones is expanded to such a size that each icon/key can unambiguously be finger selected. In practice, the associated touch screen zone will be of the order of at least 0.7 $cm^2$ and will typically be a square zone. In normal navigation mode, the device displays a map. Touching the map (i.e. the touch sensitive display) once (or twice in a different implementation) near to the screen centre (or any part of the screen in another implementation) will then call up a navigation menu (see FIG. 3) with large icons corresponding to various navigation functions, such as the option to calculate an alternative route, and re-calculate the route so as to avoid the next section of road (useful when faced with an obstruction or heavy congestion); or recalculate the route so as to avoid specific, listed roads.

The actual physical structure of the device is fundamentally different from a conventional embedded device in terms of the memory architecture (see system Architecture section below). At a high level it is similar though: memory stores the route calculation algorithms, map database and user interface software; a microprocessor interprets and processes user input (e.g. using a device touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination in the normal manner into the Navigator software running on the PDA using a virtual keyboard. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of Navigator (or is otherwise accessed by it) running on the PDA as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the Navigator software. The algorithms are applied to score large numbers of potential different routes. The Navigator software then evaluates them against the user defined criteria (or device defaults), such as a full mode scan, with scenic route, past museums, and no speed camera. The route which best meets the defined criteria is then calculated by a processor in the PDA and then stored in a database in RAM as a sequence of vectors, road names and actions to be done at vector end-points (e.g. corresponding to pre-determined distances along each road of the route, such as after 100 meters, turn left into street x).

Figure 4A:
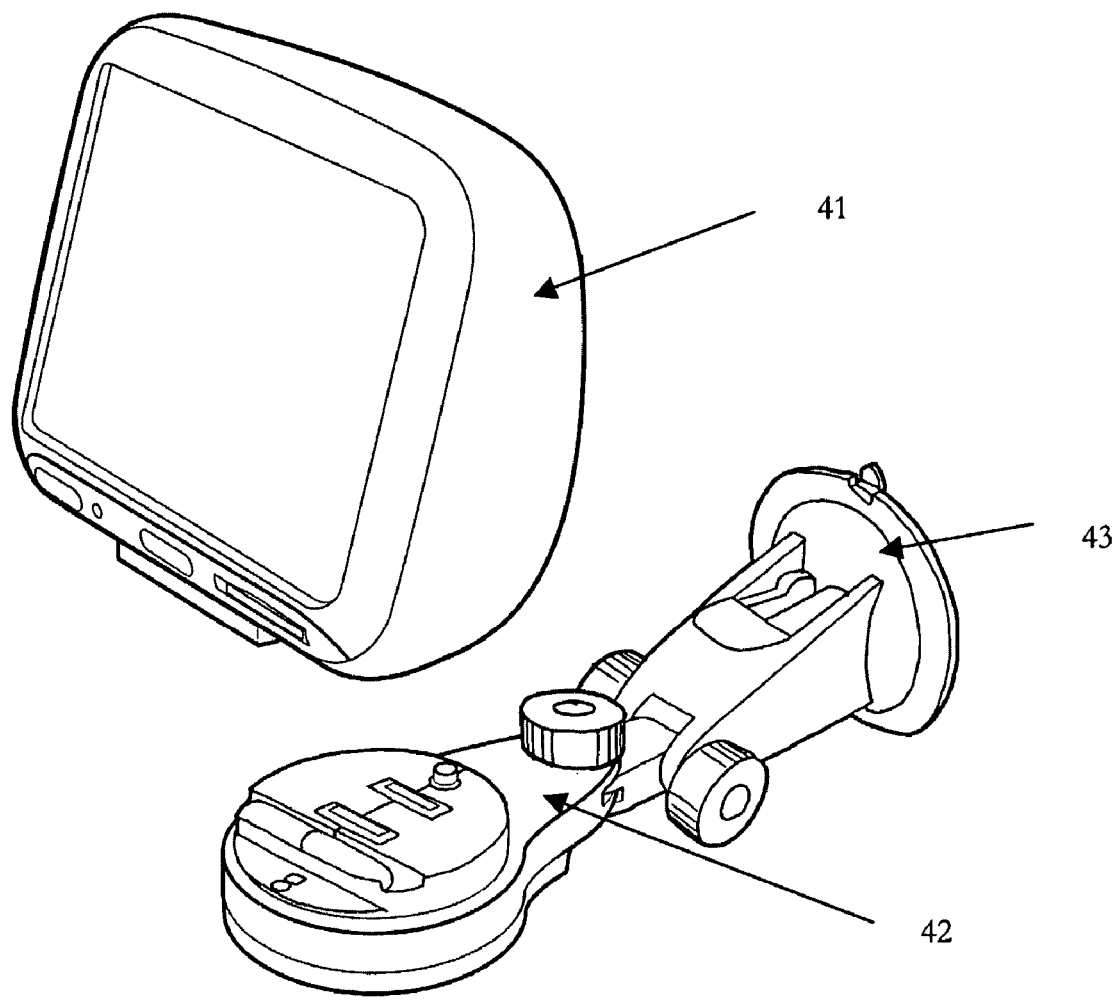
FIGS. 4A and B are perspective views of the navigation device.
Figure 4B:
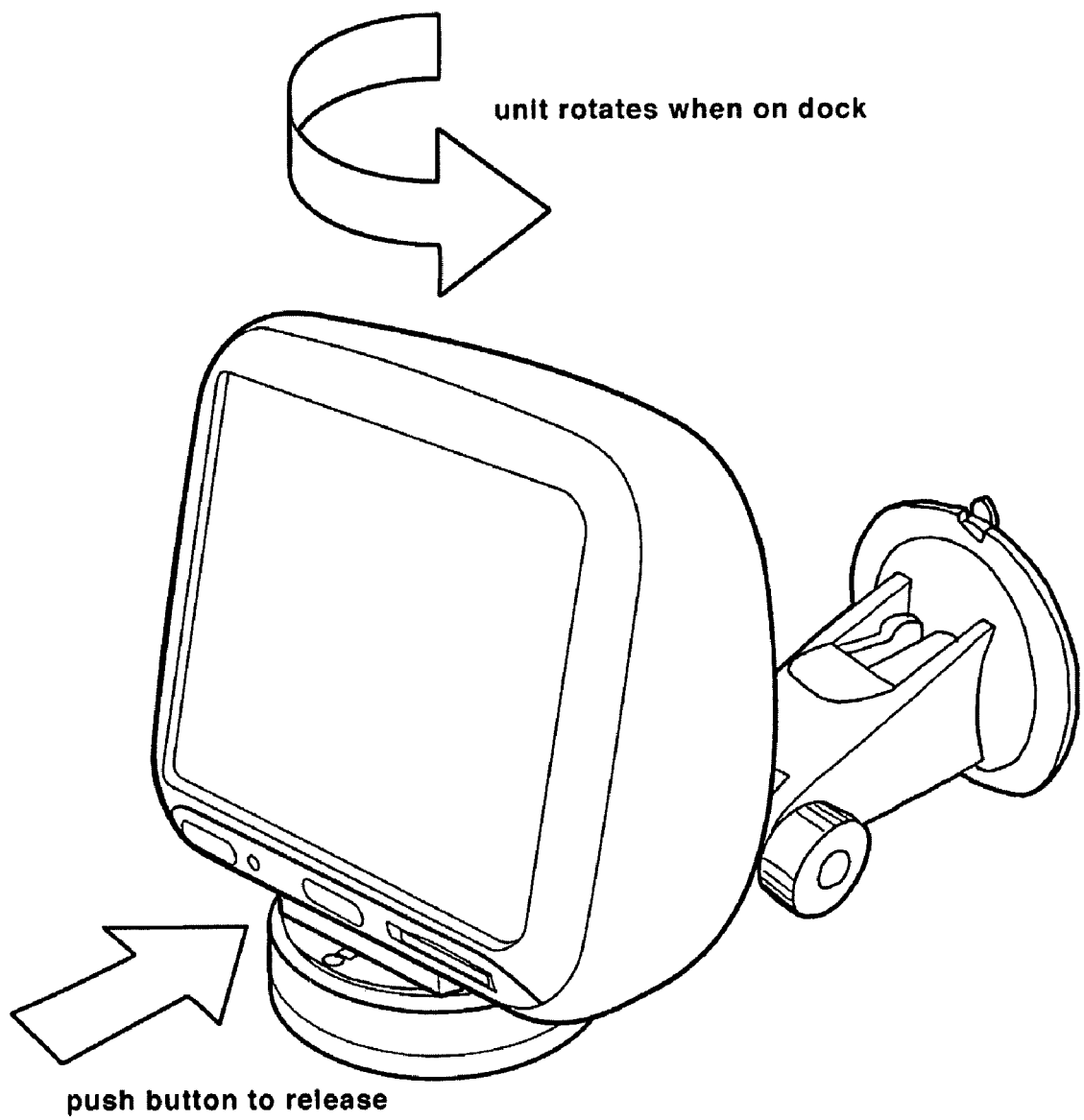

FIGS. 4A and 4B are perspective views of an actual implementation of a navigation device 41. The navigation device is a unit that includes display, internal GPS receiver, microprocessor, power supply and memory systems. The device sites on an arm 42, which itself is secured to the car dashboard using a large suction cup 43.

System Architecture

Figure 5:
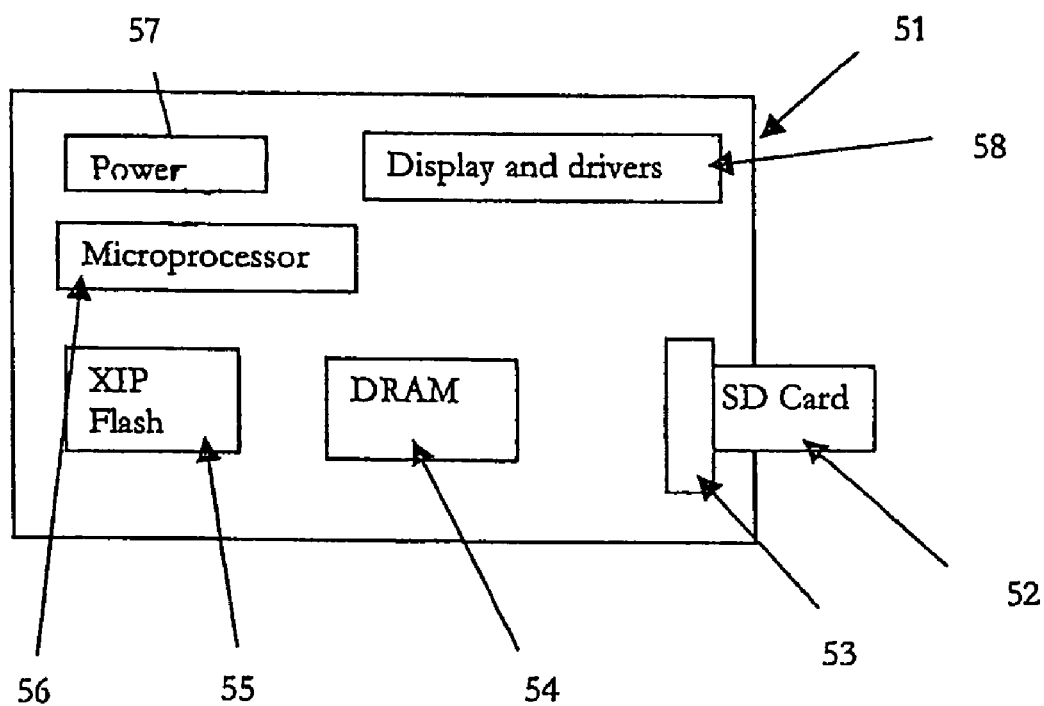
FIG. 5 is a schematic view of the system architecture for the navigation device.

In contrast to conventional embedded devices which execute all the OS and application code in place from a large mask ROM or Flash device, an implementation of the present invention uses a new memory architecture. FIG. 5 schematically depicts the device. The device, indicated generally at 51, includes conventional items such as a microprocessor 56, power source 57, display and related drivers 58. In addition, it includes a SD card reader 53; a SD card 52 is shown slotted into position. The device 51 has internal DRAM 54 and XIP Flash 55.

The device hence uses three different forms of memory:
1. A small amount of internal XIP (eXecute In Place) Flash ROM 55. This is analogous to the PC's BIOS ROM and will only contain a proprietary boot loader, $E^2$ emulation (for UID and manufacturing data) and splash screen bit maps. This is estimated to be 256 KB in size and would be on a slow 8 bit wide SRAM interface.
2. The main system RAM (or DRAM) memory 54, this is analogous to the PC's main memory (RAM). This will be where all the main code executes from as well as providing the video RAM and workspace for the OS and applications. Note: No persistent user data will be stored in the main system RAM (like a PC) i.e. there will be no "Ram drive". This RAM will be exclusively connected to a 32 bit 100 MHz synchronous high-speed bus.
3. Non-volatile storage, analogous to the PC's hard disk. This is implemented as removable NAND flash based SD cards 52. These devices do not support XIP. All the OS, application, settings files and map data will be permanently stored on SD cards On boot up the proprietary boot loader 55 will prompt for the user to insert the supplied SD card 52. When this is done, the device will copy a special system file from the SD card 52 into RAM 54. This file will contain the Operating System and navigation application. Once this is complete control will be passed to the application. The application then starts and access non-volatile data e.g. maps from the SD card 52.

When the device is subsequently switched off, the RAM 54 contents is preserved so this boot up procedure only occurs the first time the device is used.

APPENDIX 1

GO Product Specification

Introduction

Go is a stand-alone fully integrated personal navigation device. It will operate independently from any connection to the vehicle.

Target Markets

Go is indented to address the general personal navigation market. In particular it is designed to extend the market for personal navigation beyond the "early adopter" market. As such it is a complete stand-alone solution; it does not require access to a PC, PDA or Internet connection. The emphasis will be on completeness and ease of use. Although Go is a complete personal navigation solution it is primarily intended for in vehicle use. The primary target market is anybody who drives a vehicle either for business or pleasure.

To successfully address this market Go must satisfy the following top-level requirements:
1. Acceptable price point—Appropriate compromise between product features and cost.
2. Simplicity—Installation and operation of Go will be simple and intuitive, all major functions should be accomplished by an average non PC-literate user without recourse to the product manual.
3. Flexibility—All map data and operating programs will be supplied on plug in memory cards. The device can easily be extended to cover different locals.
4. Reliability—Although in-car navigation systems are not considered safety critical components users will come to rely on Go. It will be engineered to all relevant automotive environmental standards. In addition it will be tolerant to short GPS coverage outages.

Channels

Consumer electronics retail outlets
Automotive accessory outlets
Specialist car accessory fitting garages Product Summary Go is an in-vehicle personal navigation device. It is designed as an appliance, that is, for a specific function rather than a general purpose one. It is designed for the consumer after-sales automotive market. It will be simple to use and install by the end user, although a professional fitting kit will be optionally supplied.

The principal features are:
Built on standard commodity PocketPC 2002 components
Standard PocketPC 3.5" ¼ VGA transflective TFT LCD display mounted in landscape orientation
Romless soft-boot memory architecture
Highly integrated ARM9 200 MHz CPU
SD card memory slot for application and map data storage
Integrated GPS receiver and antenna
Integrated two axis accelerometer for simple dead reckoning
Power, audio, debug and external GPS antenna connections made through docking connector on base of unit
Embedded Linux OS with no GUI layer, application provides its own UI
Very simple touch screen UI optimised for finger use
High quality integrated speaker for voice instructions
Internal rechargeable Li-Ion battery giving at least five hours of continuous operation Operating System Go will use a customised version of embedded Linux. This will be loaded from an SD card by a custom boot-loader program which resides in Flash memory Hard Buttons Go will have only one hard button, the power button. It is pressed once to turn on or off Go. The UI will be designed so that all other operations are easily accessible through the pen based UI.

There will also be a concealed hard reset button.

Architecture

Go architecture is based around a highly integrated single chip processor designed for mobile computing devices. This device delivers approximately 200 MIPs of performance from an industry standard ARM920T processor. It also contains all the peripherals required excluding the GPS baseband. These peripherals include DRAM controller, timer/counters, UARTs, SD interface and LCD controller.

Figure 6:
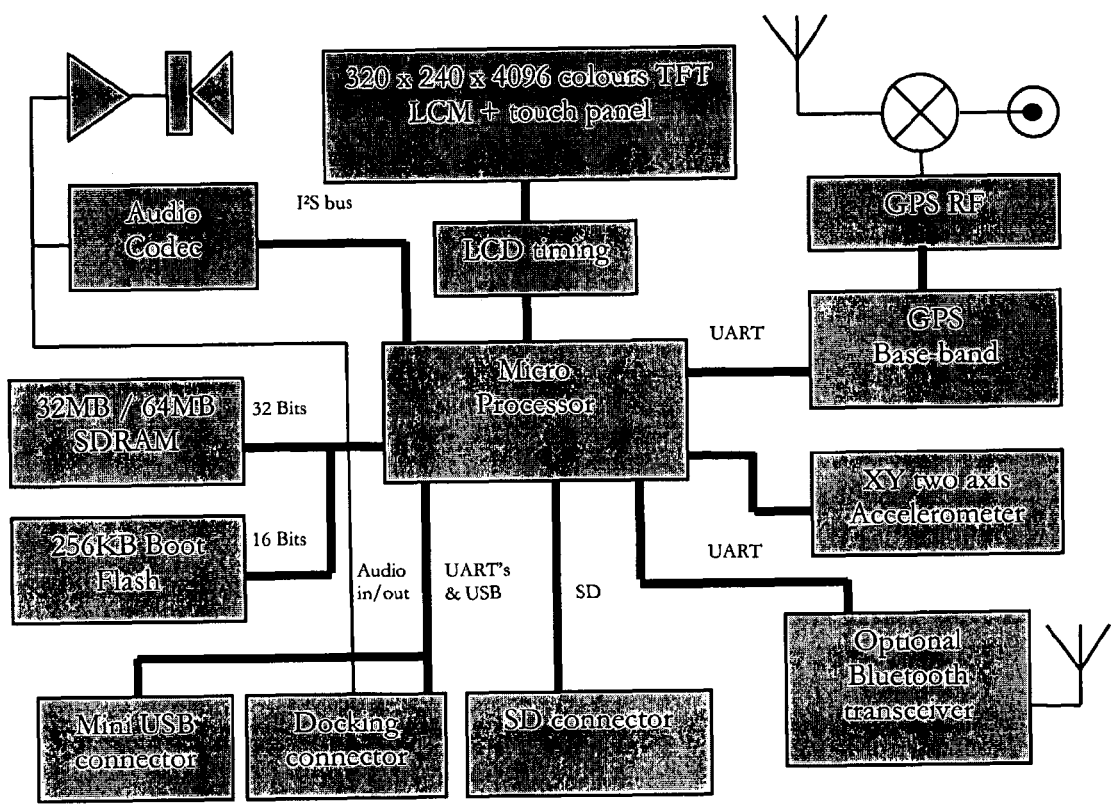
FIG. 6 is a block diagram of components in the navigation device.

The main elements of this architecture are:
Microprocessor running at 200 MHz
32 MB or 64 MB of fast synchronous DRAM (SDRAM) with low power self refresh. Arranged as two devices on a 32 bit wide 100 MHz bus
SD card interface for all non-volatile storage including the OS (No RAM drive)
Native (bare metal) boot loader stored in 256 KB of NOR Flash. This Flash device will contain a boot sector which is write protected to store protected data such as unique product ID's and manufacturing data.
Debug UART (RS232 3V levels) connected to the docking connector
USB client for PC connectivity
Integrated GPS receiver
Integrated two axis accelerometer
Optional integrated Bluetooth transceiver for PDA and mobile phone connectivity
High quality audio through $I^25$ codec and amplifier
FIG. 6 is the Go block diagram.

Power Management

Go will be powered from an integrated Li-Ion 2200 mAH rechargeable battery. This battery can be charged, and the device powered (even if the battery contains no charge) from an externally supplied +5V power source. This external +5V power source is supplied via the docking connector or a DC jack socket.

This +5V supply will be generated from the vehicle's main supply rail or from a mains adapter externally. The device will be turned on and off by a single button. When the device is turned off the DRAM contents will be preserved by placing the RAM in self-refresh so that when switched on Go will resume from where it was switched off. There will also be a wake-up signal available through the docking connector, this can be used to auto-switch on Go when the vehicle ignition is switched on.

There will also be a small hidden reset switch.

System Memory Architecture

In contrast to conventional embedded devices which execute all the OS and application code in place from a large mask ROM or Flash device, Go will be based on a new memory architecture which is much closer to a PC.

This will be made up of three forms of memory:
4. A small amount of XIP (eXecute In Place) Flash ROM. This is analogous to the PC's BIOS ROM and will only contain a proprietary boot loader, $E^2$ emulation (for UID and manufacturing data) and splash screen bit maps. This is estimated to be 256 KB in size and would be on a slow 8 bit wide SRAM interface.
5. The main system memory, this is analogous to the PC's main memory (RAM).

This will be where all the main code executes from as well as providing the video RAM and workspace for the OS and applications. Note: No persistent user data will be stored in the main system RAM (like a PC) i.e. there will be no "Ram drive". This RAM will be exclusively connected to a 32 bit 100 MHz synchronous high-speed bus. Go will contain two sites for 16 bit wide 256/512 Mbit SDRAM's allowing memory configurations of 32 MB (16 bit wide) 64 MB 32 bit wide and 128 MB (32 bit wide).

6. Non-volatile storage, analogous to the PC's hard disk. This is implemented as removable NAND flash based SD cards. These devices do not support XIP. All the OS, application, settings files and map data will be permanently stored on SD cards Audio A 52 mm diameter speaker is housed in Go to give good quality spoken instructions. This will be driven by an internal amplifier and audio codec. Audio line out will also be present on the docking connector.

SD Memory Slot

Go will contain one standard SD card socket. These are used to load system software and to access map data.

Display

Go will use a transflective 3.5" TFT backlit display It will be a 'standard' ¼ VGA display as used by PocketPC PDA's. It will also contain a touch panel and bright CCFL backlight.

Power Supplies

Power Supply—AC Adapter Socket
4.75V to 5.25V (5.00V+/−5%) @ 2 A

Power Supply—Docking Connector
4.75V to 5.25V (5.00V+/−5%) @ 2 A

Variants

It shall be possible to assemble and test the following variants of Go:

Standard (Bluetooth Depopulated, 32 Mbyte RAM)
In the Standard variant the Bluetooth function is not populated, and 32 Mbytes RAM is fitted.

Bluetooth Option (Future Variant)
The product design should include Bluetooth although it is not populated in the standard variant to minimise BOM cost. The design should ensure that all other functions (including GPS RF performance) operate without degradation when the Bluetooth function is operating.

64 Mbyte RAM Option (Future Variant)
The product design should ensure it is possible to fit 64 Mbyte RAM instead of 32 Mbyte.

Subassemblies

Figure 7:
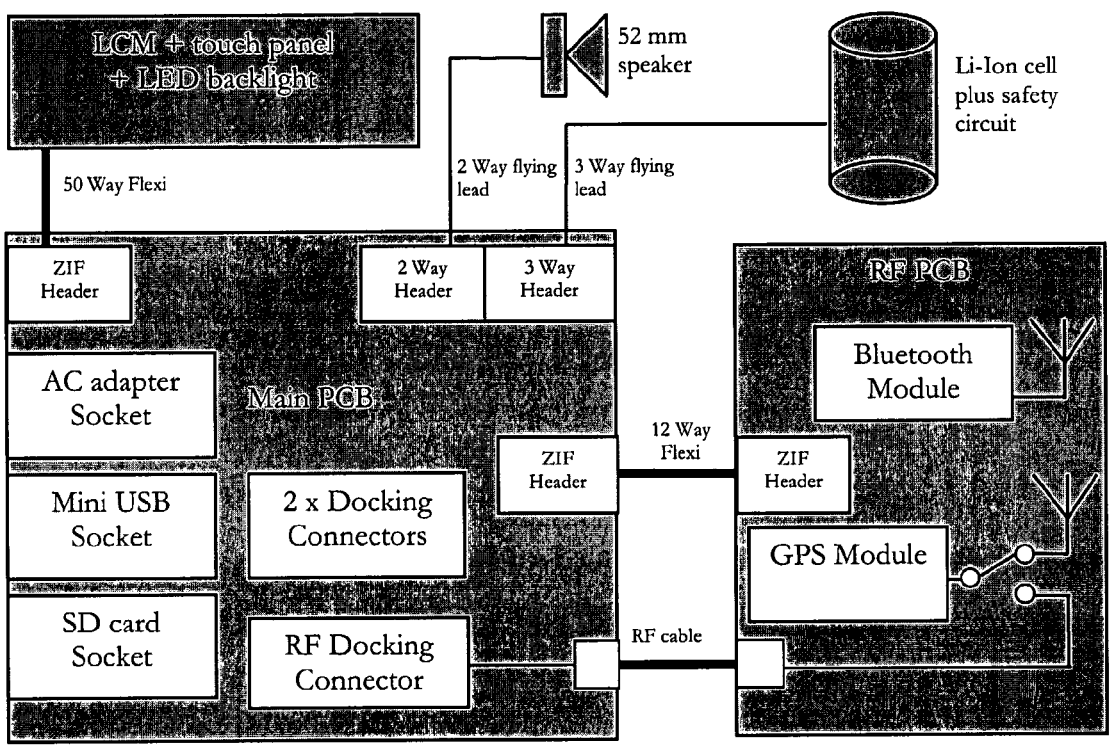
FIG. 7 is a diagram of the electrical subassemblies in the FIG. 6 navigation device.

Go consists of the following electrical subassemblies, shown in FIG. 7.

RF Cable
The RF cable feeds the RF signal from an external GPS antenna (which connects to Go via the RF docking connector) to the RF PCB where the GPS module is situated.

External Connectors

Docking Connectors
Two Docking Connectors provide an interface to external Docking Stations.

Docking Connector #1 Pinout

| Pin | Signal | Dir | Type | Description |
|---|---|---|---|---|
| 1 | GND | — | — | Signal and power GND |
| 2 | GND | — | — | |

-continued

| Pin | Signal | Dir | Type | Description |
|---|---|---|---|---|
| 3 | DOCKSNS1 | I/P | PU | Docking Station Sense [0, 1] - These signals are |
| 4 | DOCKSNS0 | I/P | PU | connected to pull-up resistors within the unit. The Docking Station pulls either or both of these signals to GND to indicate the presence and type of Docking Station. |
| 5 | AUDIOL | O/P | | Audio line outputs (Left and Right) to connect to |
| 6 | AUDIOR | O/P | | car audio system. |
| 7 | MUTE | O/P | O/D | The unit pulls this line to GND to signal the car audio system to mute itself while the unit is issuing a voice command. |
| 8 | IGNITION | I/P | PD | Ignition sense. |
| 9 | DOCKPWR | I/P | PWR | +5 V power from the Docking Station to |
| 10 | DOCKPWR | I/P | PWR | simultaneously power the unit and charge the battery. |

PWR Power connection
O/D Open-Drain output
PU Pull-Up resistor within the unit
PD Pull-Down resistor within the unit Docking Connector #2 Pinout

| Pin | Signal | Dir | Type | Description |
|---|---|---|---|---|
| 1 | TXD | O/P | UART | 3 V logic level UART signals |
| 2 | RXD | I/P | UART | |
| 3 | RTS | O/P | UART | |
| 4 | CTS | I/P | UART | |
| 5 | GND | — | PWR | |
| 6 | nTRST | I/P | JTAG | CPU JTAG signals for test and configuration |
| 7 | TMS | I/P | JTAG | |
| 8 | TCK | I/P | JTAG | |
| 9 | TDI | I/P | JTAG | |
| 10 | TDO | O/P | JTAG | |

RF Docking Connector

The RF Docking Connector allows connection of an external active GPS antenna via a Docking Station.

AC Adapter Socket The AC adapter socket allows power to be supplied from a low cost AC adapter or CLA (Cigarette Lighter Adapter).

USB Connector

The USB connector allows connection to a PC by means of a standard mini USB cable.

SD Card Socket

A hard locking SD card socket suitable for high vibration applications supports SDIO, SD memory and MMC cards.

(Although Go provides hardware support for SDIO, software support will not be available at the time of product introduction)

Processor

The processor is the ARM920T based SOC (System on chip) operating at approx 200 Mhz.

RAM

Go will be fitted with RAM to the following specification:

| Type | SDRAM with low-power refresh ("mobile" SDRAM) |
|---|---|
| Total memory | 32 Mbyte (standard) or 64 Mbyte (future option) |
| Bus width | 32-bit |
| Minimum speed | 100 Mhz |
| Maximum self refresh current | 500_A per device |
| Configuration | 2 × 16-bit wide CSP sites |

Flash Memory

Go will be fitted with a minimum of 256 kbyte of 16-bit wide Flash Memory to contain the following:

Boot loader code to enable loading of O/S from SD card

Factory set read-only protected manufacturing parameters (e.g. manufactured date) and unique ID (E2PROM emulation)

User specific settings (E2PROM emulation)

The following devices can be used depending on price and availability:

GPS Internal Antenna

The GPS internal antenna is attached directly to the RF PCB.

GPS External (Active) Antenna Switching

When an external antenna is connected via the RF Docking Connector, the GPS antenna source is automatically switched to the external antenna.

Accelerometer

A solid state accelerometer is connected directly to the processor to provide information about change of speed and direction.

Auxiliary Functions

Ignition Synchronization

Ignition Wakeup

A rising edge on the Docking Station IGNITION signal will wakeup the unit. The IGNITION signal may be connected to a 12V or 24V vehicle battery.

Ignition State Monitoring

The state of the Docking Station IGNITION signal is detected and fed to a GPIO pin to allow software to turn off the unit when the ignition signal goes low.

Standard Peripherals

The following peripherals will be included as standard with Go.

- Simple docking shoe. Mounts Go and allows charging through a DC jack. No other connectivity is included in the simple dock.
- Cigarette lighter power cable connecting to Go through the DC jack socket or simple docking shoe.
- Mini USB cable for PC connectivity
- Universal mains adapter for connection to DC Jack socket Optional Peripherals The following optional peripherals will be available at or after the time of launch of Go

- Active antenna kit. Contains a GPS active antenna and a docking shoe with GPS RF connector and cable fitted. For self installation when an external antenna is required.
- Professional vehicle docking kit. For fitting by professional installation only. Allows direct connection to vehicle supply, audio system and active antenna via a vehicle interface box.

The invention claimed is:

1. An in-vehicle personal navigation device that enables a user to navigate to a pre-defined destination, comprising:
    an internal satellite positioning receiver;
    a power switch;
    a touch screen display activated by the power switch;
    a random access memory (RAM) component;
    a read only memory (ROM) component;
    a portable memory device interface configured to receive a portable memory device; and
    a portable memory device having a system file contained thereon, the system file including an operating system, a navigation application and map data, wherein
        the ROM component is configured to prompt the user to insert the portable memory device upon boot up of the navigation device, and
        once the user inserts the portable memory device into the portable memory device interface the system file is copied from the portable memory device into the RAM component.

2. The device of claim 1, wherein the navigation device does not store the operating system in internal ROM but instead reads the operating system from a memory card.

3. The device of claim 1, wherein the portable memory device is a secure digital (SD) card.

4. The device of claim 1, wherein the ROM component is an internal XIP (execute In Place) Flash ROM programmed with a boot loader.

5. The device of claim 1, wherein once copying of the system file is complete, control of the navigation device is passed to the navigation application, which starts and accesses non-volatile data from the portable memory device.

6. The device of claim 5, wherein when the navigation device is switched off, contents of the RAM component are preserved so that the boot up procedure only has to occur the first time the navigation device is used.

7. A method of programming an in-vehicle personal navigation device with a map database and software that enables a route to be planned between two user-defined places, wherein the method comprises:
    connecting the navigation device to a memory card, the memory card storing an operating system: a navigation application including core functions accessible via a single touch to a touch screen display, and map data, the memory card being insertable into and removable from the navigation device;
    reading the operating system, the navigation application, and the map data from the memory card;
    storing the operating system in internal random access memory (RAM); and
    executing a boot loader program stored on an execute in place (XIP) read only memory (ROM) thereby prompting a user to insert the memory card on boot up.

8. The method of claim 7 in which the memory card is a SD card.

9. The method of claim 7, further including copying a system file from the memory card into the RAM, the system file including the operating system and the navigation application.

10. The method of claim 9, further including passing control of the navigation device to the navigation application, which starts and accesses non-volatile data from the memory card.

11. The method of claim 10, further including preserving contents of the RAM when the navigation device is switched off so that the boot up procedure only has to occur the first time the navigation device is used.

12. The device of claim 1, wherein the navigation application includes core functions accessible via a single touch to the touch screen display.

* * * * *